United States Patent

[11] 3,588,737

[72] Inventor Ken Tang Chow
Portola Valley, Calif.
[21] Appl. No. 723,354
[22] Filed Apr. 22, 1968
[45] Patented June 28, 1971
[73] Assignee Electro Nuclear Laboratories, Inc.
Menlo Park, Calif.

[54] THERMALLY STABILIZED LASER
2 Claims, 4 Drawing Figs.
[52] U.S. Cl. ............................................... 331/94.5
[51] Int. Cl. ............................................... H01s 3/02
[50] Field of Search ................................... 331/94.5

[56] References Cited
UNITED STATES PATENTS
3,484,718 12/1969 Foster .......................... 331/94.5

OTHER REFERENCES

Piltch, M. etal. " High Temperature Alumina Discharge Tube for Pulsed Metal Vapor Lasers" . An article from the Review of Scientific Instruments. Vol. 37, No. 7, July 1966. p. 925— 927.

Spectra-Physics. " Model 119 Single-frequency Gas Laser Technical Specification Sheet" January 15, 1965. 2 Sides. Received in Group January 18, 1965.

Primary Examiner—Ronald L. Wibert
Assistant Examiner—T. Mavor
Attorney—Dominik, Knechtel & Godula ABSTRACT: A laser is disclosed having an imperforate tubular body which in one embodiment is disclosed as having a composition including asbestos with a low thermal coefficient of expansion and a low thermal coefficient of transmission of heat, and in another embodiment is disclosed as a multiwall metal imperforate body having an airtight space between the two walls. In operation the laser plasma tube stabilizes at a higher temperature than the prior art units with a perforated body, but a translation (pointing stability) of 0.0001 inches/13 inches/hour can be achieved.

Patented June 28, 1971
3,588,737
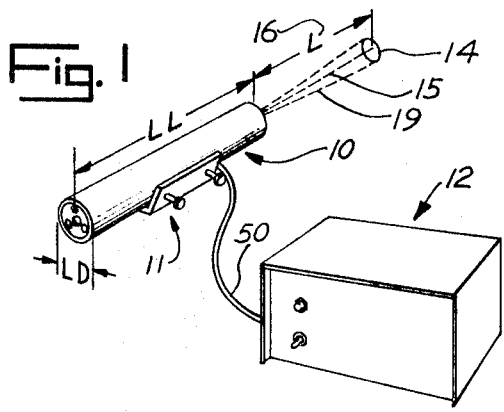
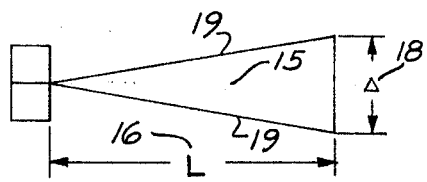
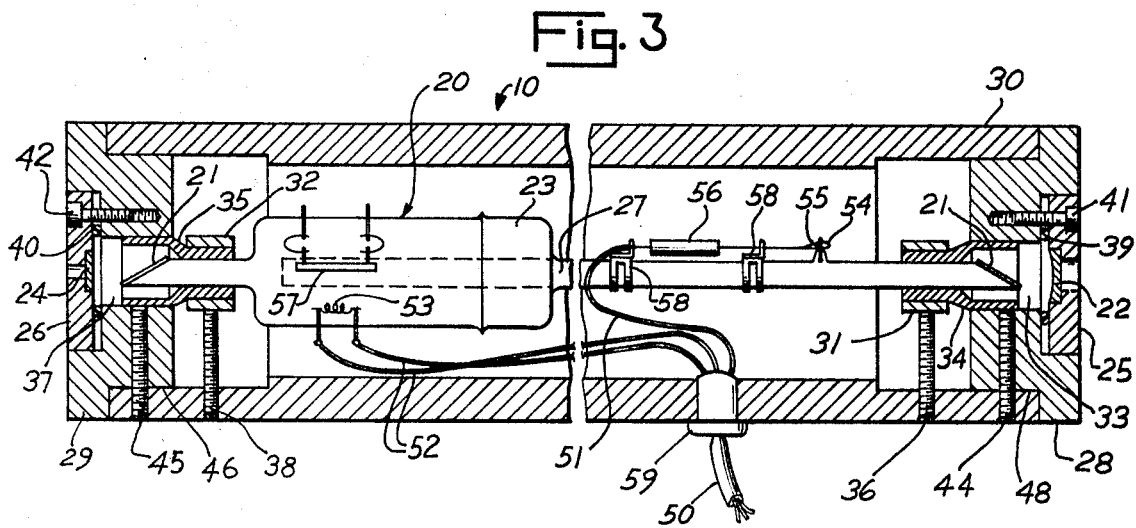
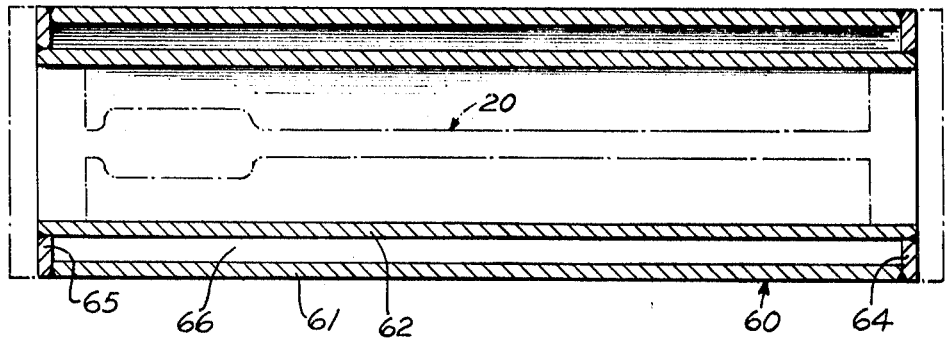
INVENTOR.
KEN TANG CHOW
BY Dominik, Stein & Knechtel
ATTORNEYS

THERMALLY STABILIZED LASER

The present invention relates to a thermally stabilized laser. In greater detail, the invention contemplates a gas laser in which stabilization is achieved by insulating the plasma tube and the associated mirror system from variations in the ambient environment.

While the first recognized patent on a laser is U.S. Pat. No. 2,929,922, refinements in the structure are not disclosed which permit both practical commercial application, and low cost manufacture. The present invention deals significantly with both factors.

By way of explanation, a laser is a light source that emits coherent, nearly monochromatic radiation. The monochromatic character of the radiation stems from an electron transition between two well-defined energy states of a gas atom which is confined to emit photons at a relatively constant frequency. The coherence of the radiation depends upon a fixed phase relationship between the transverse electromagnetic oscillations at any two points in the wave front of the advancing light. A wide variety of gases in ion lasers are contemplated, such as carbon dioxide, argon, and helium neon. The description which follows, while relating to a helium neon gas laser, is applicable to all systems requiring externally reflecting mirrors.

In a helium neon laser, the beam is excited by applying a large voltage across a tube containing a mixture of helium and neon gases, much in the same way an ordinary fluorescent light tube operates when a voltage is put across its input leads. A fluorescent light tube will not produce a coherent laser light, because the gas mixture employed and the geometry of the fluorescent bulb are improper for this purpose.

In the helium-neon laser, the outer electron in each neon atom is found in the ground state most of the time. When a voltage is applied across the laser tube, these outer electrons can gain energy and move into the first or second excited states. In falling back to the first excited state or the ground state, an electron initially in the second excited state emits a photon whose frequency is characterized by the energy difference between the two energy levels of interest. This emitted light has just the right frequency to move an electron of some neighboring atom from its first to second excited state with the absorption of the incident photon. In this way a light photon may be emitted and absorbed many times before it finally escapes from the laser plasma tube.

Einstein's work led to the understanding of a new property of light, namely, that when a photon interacts with an atom already having an electron in the second excited state, it stimulates the electron to fall to the lower excited state and thereby produces a second photon of the same energy as the initial photon. In this manner a single photon incident on a gas containing many atoms with electrons in the second excited state would produce a greatly amplified beam of photons each of which results from the deexcitation of an atom of the neon gas. For the process to work, there must initially be a greater concentration of atoms in the second excited state than in the first excited state, or else the predominant effect would be that the atoms in the first excited state would absorb the incident photons.

In a normal gas there are many more atoms excited to a given energy level than there are excited to any higher energy. Thus the problem of making a gas laser operate reduces to the problem of inverting the normal distribution of atoms in the excited state. In the helium-neon laser this is accomplished because the first excited state of helium happens to have nearly the same energy as the second excited state of neon. Collisions between unexcited neon atoms and helium atoms in their first excited states can transfer the excitation energy from the helium to the neon atom. In this way there is a source of neon atoms in the second excited state and there is no similar source of neon atoms in the first excited state. Thus under proper operating conditions there can be more neon atoms in the second excited state than in the first and the required inversion of population density is achieved.

When one considers a column of neon gas with more atoms in the second excited state than the first, this column of gas approximates the conditions inside a helium-neon gas laser. When the electrons in an atom at one end of the column spontaneously fall to their first excited state, an emitted photon moves down the column. This atom may soon be reexcited to its original energy in a collision. The photon moves down the column and stimulates several atoms to become deexcited and to emit photons of the same frequency. According to the basic principles of quantum mechanics, the stimulated photons move in phase with the initial photon in the same direction. Thus emerging from the far end of the column one finds a packet of photons in phase with the initial photon intensity amplified by the stimulated emission of radiation. Actually the word "laser" is composed of the first letters of the principle words of the phrase "light amplification by simulated emission of radiation."

In the hypothetical illustration set forth above, one must bear in mind that the emission caused by the original photon ceases when the packet of photons passes through the column of gas. To preclude this phenomenon in practical situations, the emerging photons are mostly reflected back into the gas column by mirrors at either end of the column, and the process is continued indefinitely while a small beam of light emerges from the partially reflecting mirrors at both ends of the column. As the description proceeds below, the structure for amplifying this reflectivity of photons will be set forth in detail.

Because of its piercing stability, a laser beam can provide a fast, positive, and accurate method for optical alignment. This is highly useful in the aircraft industry for assembling gigantic aircraft to close tolerances, in the machine tool industry, as well as for surveying. Indeed, lasers have practical application in virtually every instance where a precise and stable straight reference line is a prerequisite for alignment of equipment. In achieving such ultrastability, however, it is essential that the mirrors within the laser system be positively aligned with regard to the plasma tube at all times. Even a slight shift in the position of the mirrors will cause a change in the optical path. This wandering, in turn, will slightly detune the laser and a wandering of the laser beam may be observed.

Furthermore, the power efficiency of most laser systems is generally rather low. Almost all of the power input to the system is liberated as heat. In the present lasers known in the art, the plasma tube housing is universally made of metal, such as aluminum or steel, vented in order to dissipate the heat generated attributable to the inefficiency of the power conversion. The plasma tube metal housing also serves, through suitable connections, to support the mirror system of the laser. While this will produce a system successful for demonstrating a laser generation, it fails to provide a precise laser beam pointing stability due to the ventilation which in turn dictates a short thermal time constant. The thermal time constant is defined in terms of the time required for the system to reach new equilibrium temperature in reaction to changes of the surrounding ambient conditions. A short thermal time constant results from the high thermal conductivity of the metal housing as well as its ventilation.

In addition, the laser generators known commercially suffer from longitudinal changes which are not necessarily bilaterally symmetrical, attributable to variations in the skin temperature of the housing. Oftentimes a slight air movement caused by the movement of personnel in the vicinity of the laser head will cause such changes in skin temperature. Since the systems such as discussed have a high thermal conductivity and a high thermal coefficient of expansion, the minute variations in skin temperature will realign slightly the mirror system and result in instable thermal conditions as well as alignment. Touching the hand to the laser housing, or operating the same outdoors with wind and rain as the ambient environment will cause very substantial instability in the beam emission.

From the foregoing, the conclusion is inescapable that conventional commercially available lasers suffer from the following disadvantages which lead to the deterioration of the beam pointing stability:
1. The high thermal conductivity of the housing and mirror holding material, and,
2. The related presence of air vent holes causing oscillating temperature cycles surrounding the plasma tube and mirror system, and,
3. The short thermal time constant.

As will be set forth below, the primary objects of the present invention look to overcoming the aforesaid difficulties in a structure which is economical, efficient, and practical to manufacture.

The present invention stems from the discovery that by providing an imperforate housing for a laser system of a material having a low coefficient of thermal expansion, and excellent insulating characteristics, enhanced system stability can be attained in a short period of time and at an elevated equilibrium temperature. Moreover, the system is highly unsusceptible to degradations of stability attributable to changes in the ambient environment.

In view of the foregoing, it is one of the principal objects of the present invention to provide a laser system with a minimized sensitivity to ambient environment. Related thereto it is an object of the invention to provide a laser system which rapidly rises to its operating temperature and stabilizes at that level. An additional consideration is to provide a structure which is not only economical to manufacture, but utilizes the basic hardware in existing laser technology.

Further objects and advantages of the present invention will become apparent as the following description of a specific embodiment proceeds, taken in conjunction with the accompanying illustrative drawings in which:

FIG. 1 is a perspective, partially diagrammatic view illustrating a laser, power supply, and its target area.

FIG. 2 is a diagrammatic view illustrating dimensionally how the beam stability at target area of a laser may be determined.

FIG. 3 is an enlarged longitudinal sectional view of the illustrative helium-neon gas laser head taken along its longitudinal axis generally illustrated in FIG. 1 as L L.

FIG. 4 is a longitudinal transverse view of an alternative tubular housing employed on a helium-neon gas laser head taken along the same section lines shown in FIG. 3 with the interior elements illustrated basically in phantom lines.

With reference now to FIG. 1, it will be seen that the laser head shown in tubular silhouette outline form is supported by a mount 11. The power supply 12 is connected by an insulated power cable 50 to the laser head. A conventional power supply measures approximately 8×7×4½ inches and provides a regulated DC power of approximately 7000 volts DC open circuit, and 1200 volts DC at 13 milliamperes with load.

The laser head 10 illustrated here is slightly over 13 inches long, and approximates 2 inches in diameter. The unit emits approximately a 2 mm. diameter beam at the exit aperture. The diameter of the beam is determined at the half-power intensity point. Emission is at 6328 Angstroms (optical red). In the case of the conventional metal perforated metal tube laser, the translation (pointing stability) as defined below is 0.003 inch/13 inches/hour, whereas with the device to be described a translation (pointing stability) of 0.0001 inch/13 inches/hour can be achieved.

The deviation referred to is illustrated in FIGS. 1 and 2. As will be observed, the laser beam is focused on a target 14, the beam being illustrated by its mean effective path 15. Obviously as the laser beam 15 wanders, the beam translation limits 18 define the extreme limit of beam position, resulting in a vertical or horizontal translation at the target 14. For convenience in illustration, the beam translation limits 18 are described by linear measurement and illustrated as the mark delta shown by reference numeral 18. The length of the distance 16 between the output end of the laser and the target is shown in FIG. 2 and the accompanying tables as L.

As will become apparent with the detailed description presented in conjunction with FIG. 3 of the drawings, the laser beam pointing stability is a function of the fabricating of an imperforate housing of a material having the correct thermal characteristics. One such material is transite which is approximately 30 percent asbestos and 70 percent Portland cement. The stability performance of transite as contrasted with a housing made of metal (usually aluminum) and with perforated vent holes, is set forth in the table below:

| | Laser type (according to housing material) | |
|---|---|---|
| | Transite | Metal with vent holes |
| Laser power output (mw.) | 1.5 | 1.5 |
| Short-term output amplitude stability (10 minutes) | ±0.7% of power output | ±1.5% of power output |
| Long-term output amplitude stability (1 hour or more) | ±2% of power output | ±2% of power output |
| Translation (pointing stability) Δ/L/Hour | .0001″/13″/hour | .003″/13″/hour |

As will be observed particularly regarding the translation (pointing stability), the ratio approximates 30/1 with the illustrative transite housing.

In connection with the material selected for the housing, the following table of thermal expansion coefficients and thermal conductivity of material is illustrative of the parameters of the desirable material:

| Material | Thermal expansion coefficient (1° C.) | Thermal conductivity 20° to 100° C. Cal./cm.²/cm./sec./° C. |
|---|---|---|
| Al (commercial) | 24×10⁻⁶ | .492 |
| Ceramic (Al₂O₃) | 7-8 | .03-.06 |
| Invar (nickel 36%, steel 64%) | .9 | (¹) |
| Lava (aluminum silicate) | 2.9 | .003-.005 |
| Stainless steel | 10.3 | .107 |
| Transite (cement asbestos) | 9.0 | .0015 |

¹ Nickel .129; steel .107.

In addition to the above materials, the Johns-Manville Company manufactures an asbestos fiber bonded by epoxy, phenolic resin, or a polyester under the trademark CHEMTITE. This material has excellent strength characteristics and a thermal conductivity of 0.00068 Cal./cm.²/sec./°C. from 20° to 100° C. It also has unusually good dimensional stability resulting from a low thermal coefficient of expansion of 6 to 8 × 10¹⁶ per °C. CHEMTITE and those materials generically contemplated by the trademark, as well as transite, are ideally illustrative of the housing material, in imperforate form, which are employed with the illustrative laser of the present invention. Finally, as will be set forth below in greater detail, an alternative construction of a double-wall housing having a dead space between the inner and outer wall, when made of Invar (nickel-steel), will also achieve the thermal requirements of a housing to be employed with the present invention, namely, a low coefficient of thermal expansion and high insulating characteristics.

With the foregoing in mind outlining the basic parameters of the invention, it will be observed from FIG. 3 that the laser 10 has an imperforate tubular housing 30. Interior of the laser 10 is a glass plasma tube 20 terminating at both ends in Brewster windows 21. The Brewster windows are conventionally positioned at an angle of approximately 35° with the longitudinal axis of the plasma tube. At one end of the housing a concave output mirror 22 is secured within a mirror mount 25. At the other end of the housing, a reflecting mirror 24 is secured within a mirror mount 26. As set forth above, it will be appreciated that the alignment between the Brewster windows, the output mirror, and the reflecting mirror is critical for a tuned relationship of the laser emission. The plasma tube 20 divides itself into a cathode chamber 23, and a longitudinal photon tube 27 which, as set forth above, terminate in the Brewster windows 21.

Here it should be remarked that the tubular housing 30 may be made of transite (70 percent cement and 30 percent asbestos) or CHEMTITE (plastic bonded asbestos) or other materials exhibiting comparable thermal coefficients of expansion and heat transmission.

At the output end of the housing 30 provision is made for a circular mirror support 28 which has a neck portion 48 slideably engageable with the interior of the tubular housing 30. At the opposite reflecting end of the laser, a mirror support 29 is provided which similarly slideably engages the laser housing 30 with a neck portion 46.

The plasma tube support 31 provided adjacent the output portion of the housing, is in the form of a collar positioned and tunable by a setscrew 36. The plasma tube support 31 surrounds a dust cover 34 which in turn fits within the central bore 33 of the mirror support 28. Additionally it will be observed that mounting screws 44, 45 are provided through the housing 30 and the output mirror support 28 and reflecting mirror support 29 so that the dust covers 34, 35 are secured within their respective support bores 33, 37.

To further provide for adjustability, the output mirror mount 25 and the reflective mirror mount 26 are positionably secured with relation to the supports 28, 29 by means of output O-ring 39 and mirror O-ring 40. Adjusting cap screws 41, 42 located off center from the axis of the output mirror 32 and the reflecting mirror 24 engage the mounts, and permit the user to adjustably position the optical alignment of the output mirror 22 and reflecting mirror 24 thereby tuning the system.

As set forth above, a sliding fit between the output mirror support 28 and the reflecting mirror support 29 is provided by means of a neck portion 46, 48 machined on each assembly to slideably engage the interior portion of the imperforate housing 30.

The power supply 12 transmits its appropriate power through the power cable 50 and the cable lead 59 into the laser head. The power cable 50 includes an anode wire 51, and filament wires 52, 53. It will be observed that the anode wire 54 is connected to the anode 55 by means of an open wire connection. The anode resistor 56 is in series on the anode wire, and is secured to the capillary tube portion 27 of the plasma tube 20 by means of resistor mounting clips 58. As will also be observed, the filament wires 52 connect to the filament 53 of the plasma tube in the cathode portion 23, and oppositely the cathode 57 is mounted.

An alternative embodiment double wall housing 60 is shown in FIG. 4. There it will be seen that the housing comprises an outer wall 61 and an inner wall 62 which are imperforate. At the output end of the housing 60 a cap ring 64 is provided and secured to positionally space the inner and outer walls, and at the mirror end a similar annular cap ring 65 is provided. The outer wall 61 and the inner wall 62 thereby define an airtight space 66 which can either be evacuated, filled with insulating material, or filled with air or any gas in either of these alternatives, the provision of insulating characteristics attributable to the imperforate construction of the housing, coupled with the employment of a metal having a low coefficient of thermal expansion, produces the results required by the invention.

In review it will be seen that a laser has been disclosed in which the housing, of alternative materials and construction, is substantially imperforate. Additionally, the insulating characteristics of the housing are maximized. The end result is that instead of employing the techniques of the prior art to cool the plasma tube, the plasma tube is permitted to stabilize quickly at its elevated equilibrium temperature within the interior of the housing. Furthermore, by employing a housing material which has a low thermal coefficient of expansion, the optical path—i.e. the geometrical relationship between the Brewster windows, the reflecting mirror, and the output mirror—is kept intact with only minor perturbations, and the output amplitude stability and translation (pointing stability) remain unchanged by variations in ambient temperature or disturbance.

Although particular embodiments of the invention have been shown and described in full here, there is no intention to thereby limit the invention to the details of such embodiments. On the contrary, the intention is to cover all modifications, alternative embodiments, usages and equivalents of a thermally stabilized laser as fall within the spirit and scope of the invention, specification and the appended claims.

I claim:

1. A thermally stabilized laser comprising, in combination, a tubular-shaped double wall enclosure, defining a longitudinal annular sealed void therebetween a plasma tube in said enclosure, means for adjustably mounting the plasma tube paraxially within, an output end mirror secured to one end of said enclosure, a flat mirror secured to the other end of said enclosure, said enclosure being imperforate and consisting of bonded asbestos fiber and having a coefficient of thermal expansion of $9 \times 10^{16}/1°$ C. and thermal conductivity of 0.0015 Cal./cm.$^2$/cm./sec./°C. (in the range from 20° C. to 100° C.), said plasma tube being the sole source of heat within said enclosure and being permitted to stabilize quickly at its elevated equilibrium temperature within the interior of said enclosure as a result of its being effectively insulated from variations in the ambient environment.

2. The laser of claim 1, wherein said enclosure is formed from a material selected from the class consisting of an asbestos base having a cementitious bonding ingredient.